Aug. 9, 1960    K. REICH    2,948,541
CHUCK
Filed March 26, 1958    2 Sheets-Sheet 1

INVENTOR.
Kurt Reich
BY
Patent Agent

Aug. 9, 1960  K. REICH  2,948,541
CHUCK
Filed March 26, 1958  2 Sheets-Sheet 2
Fig. 2
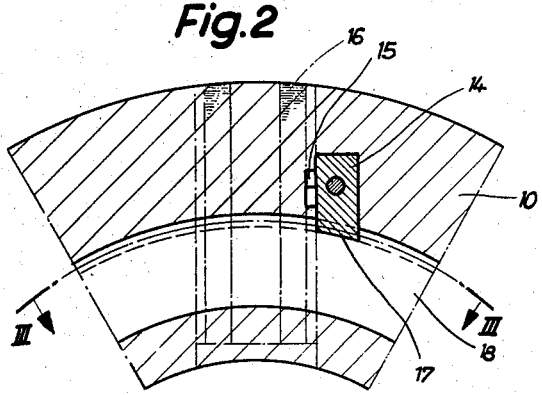
Fig. 3
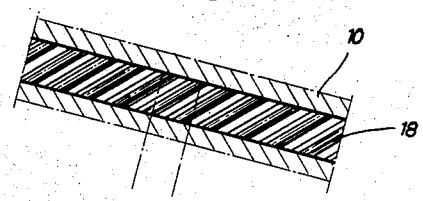
Fig. 4
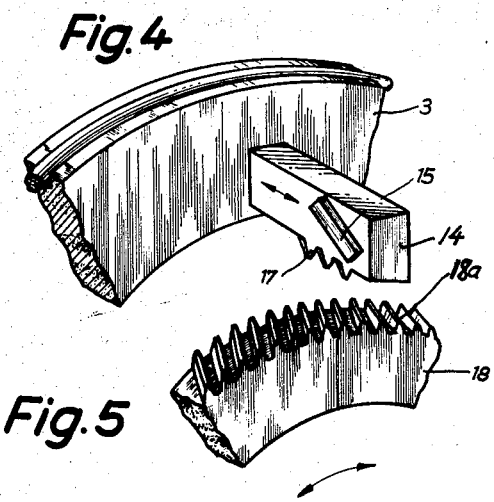
Fig. 5
INVENTOR.
Kurt Reich
BY

United States Patent Office 2,948,541
Patented Aug. 9, 1960

2,948,541

CHUCK

Kurt Reich, Dusseldorf, Germany, assignor to Paul Forkardt Kommanditgesellschaft, Dusseldorf, Germany Filed Mar. 26, 1958, Ser. No. 724,211

Claims priority, application Germany Apr. 2, 1957

2 Claims. (Cl. 279—4)

The present invention relates to a power actuated chuck such as a jaw chuck for lathes, and, more specifically, to large diameter chucks operable by a pressure fluid.

With jaw chucks of the above mentioned type, the jaws are moved radially and put under pressure by means of a piston which is axially actuated by a pressure fluid and is moved parallel to the longitudinal axis of the chuck. The longitudinal movement of the piston is transformed into a radial movement of the jaws by means of levers, links, inclined surfaces or the like. A uniform movement of the jaws and thereby a proper rotary movement of the work piece held by said jaws is assured by causing one and the same piston to actuate all jaws at the same transmission ratio.

With a large diameter chuck, especially if the latter also has a large bore, the guiding of the central piston and, more specifically, the ratio of length to diameter of the guiding means becomes rather unfavorable. This situation is further worsened by the fact that the power transmission to the jaws is effected rather far outwardly thereof. Different resistances encountered by the jaws during their movement can easily bring about a canting and jamming of the piston, which fact not only brings about a loss in power and precision but may even affect the proper operation of the chuck altogether.

If the chuck is equipped with an additional compressed air operated cylinder piston system, in which the piston is connected with the piston of the chuck by a rod, link, tube or the like, there exists the possibility of designing the system of the two pistons and their connecting members so rigid that the two pistons will act as a single body guided over a considerable length. In such an instance, the difficulty of canting and jamming referred to above will not occur. Such a system, however, is rather complicated and expensive.

There are also known chucks in which the actuating piston for the jaws is actuated directly by a pressure fluid and which for reason of space has to be designed as short as possible. Such a piston, however, cannot by itself alone meet the requirements of a proper guiding and uniform movement of the jaws. On the other hand the space, however, available is generally not sufficient for additional guiding means to assure proper guiding of the jaws.

It is, therefore, an object of the present invention to provide a jaw chuck, in which the jaw-actuating piston is directly fluid pressure operated without the drawbacks referred to in the preceding paragraph.

It is another object of this invention to provide a jaw chuck with directly fluid operated piston for the jaws, which will assure a proper guiding of the jaws and a uniform movement thereof.

These and other objects and advantages of the invention will appear more clearly from the following specification in connection with the accompanying drawings, in which:

Fig. 2 is a section along the line II—II of Fig. 1.

Fig. 3 is a section taken along the line III—III of Fig. 2.

Fig. 4 shows a portion of a piston used in connection with the chuck of the present invention and also shows a wedge bar connected thereto.

Fig. 5 is a portion of a gear ring for cooperation with the teeth on the wedge bars.

*General arrangement*

Figure 1:
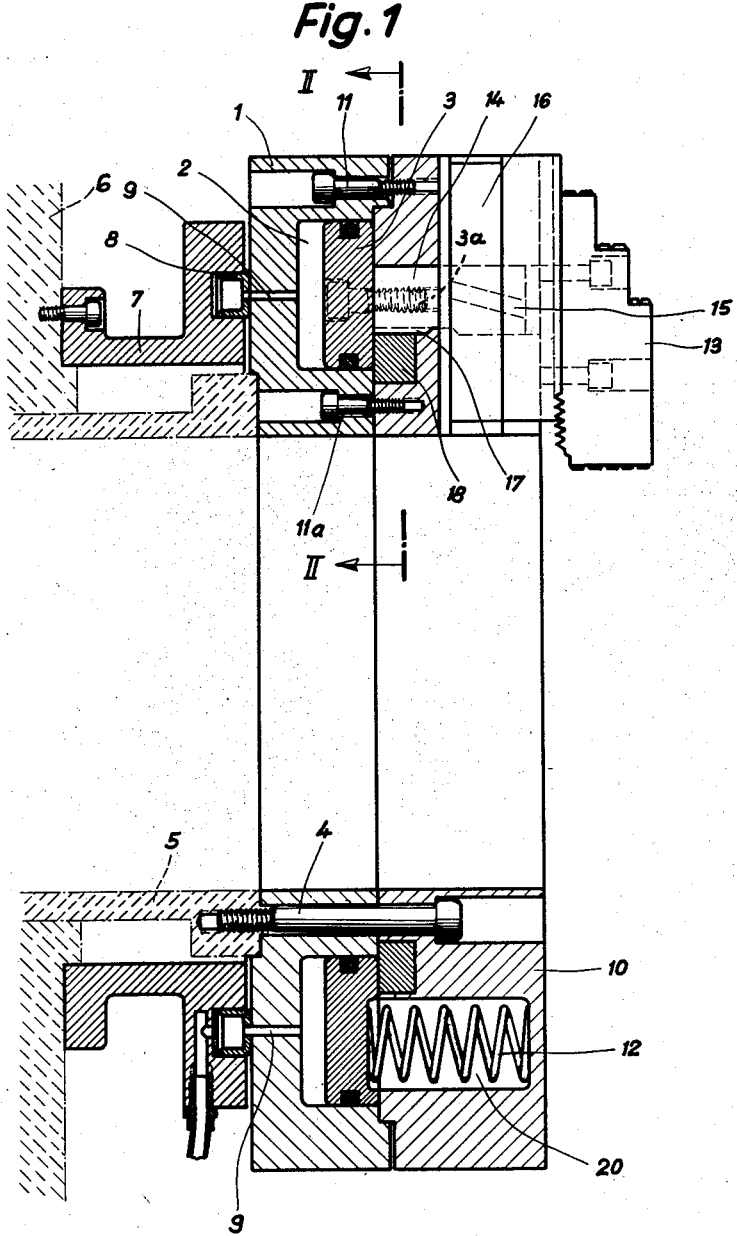
Fig. 1 represents a longitudinal section through a jaw chuck according to the present invention.

The chuck according to the present invention is characterized primarily in that the jaws are operatively interconnected by means of a rotatable ring. The said ring is provided with helical teeth which mesh with helical teeth of three or more bolts or bars arranged substantially parallel to the axis of the chuck and firmly connected with the piston of the chuck in such a way that longitudinal movement of the piston will bring about rotative movement of said ring. If with this arrangement, one of the bolts or bars has the tendency to lag, it is forced to move on by the gear ring. In this way, a safe guiding of the piston and a uniform movement of the chuck jaws will be obtained while only a small axial space is required.

According to a further development of the invention, the bolts or bars equipped with helical teeth also carry the wedge surfaces which bring about the drive of the jaws.

*Structural arrangement*

Referring now to the drawings in detail, the invention will be described as applied for instance to a so-called front end chuck the jaws of which are closed by built-in spring packets and are opened by means of compressed air against the thrust of said springs. It is, however, to be understood that this particular field of application of the present invention is given merely by way of example and not by way of limitation.

The front end chuck as shown in the drawing comprises in a manner known per se a base body 1 which comprises an annular cylinder chamber 2 and an annular piston 3 reciprocably mounted therein. The base body 1 is connected to the spindle end 5 in any convenient manner for instance by screws 4. Arranged between the head stock 6 and the rotary base body 1 is a stationary air feeding ring 7 with a sleeve, collar or the like 8. Compressed air is conveyed through said sleeve or collar and passages 9 into the cylinder chamber 2.

The base body 1 has connected thereto a guiding body 10 for instance by means of screws 11, 11a. A plurality of spring packets 12 are arranged in corresponding recesses 20 provided in the guiding body 10.

A plurality of wedge bars or rods 14 corresponding in number to the number of the chuck jaws 13 are directly connected with the piston 3 in any convenient manner for instance by means of screws 3a (one only being shown). The said bars or rods 14 are in a manner known per se equipped with inclined or helical teeth 15 for cooperation with the base jaws 16. If by means of springs 12, piston 3 is moved toward the left with regard to Fig. 1, the wedge bars or rods 14 will act upon the base jaws 16 and thereby upon the chuck jaws 13 in a closing direction, i.e., in a direction to move the chuck jaws in radial direction toward each other. If, however, compressed air or other pressure fluid is conveyed through passages 9 into the cylinder chamber 2, piston 3 will be displaced toward the right with regard to Fig. 1 with the result that the chuck jaws are moved radially outwardly, in other words are moved in opening direction.

In order to assure a good guiding of the piston 3, the wedge bars or rods 14 are additionally equipped with helical teeth 17 which mesh with teeth 18a of a gear ring 18. The gear ring 18 is rotatably journalled in the guiding body 10 in such a way that it is adapted to rotate in said guiding body 10 about the longitudinal axis of said chuck while being prevented from moving in axial or radial direction of said chuck.

In as much as all bars or rods 14 together mesh with the teeth of gear ring 18, a uniform axial displacement of all bars or rods 14 is obtained whereby a proper displacement of piston 3 will be assured at all times.

It is, of course, to be understood that the present invention is, by no means, limited to the particular construction shown in the drawings but also comprises any modifications within the scope of the appended claims.

What I claim is:

1. In a chuck having a plurality of radially movable jaws, the combination of: fluid operable axially movable piston means, means operatively interconnecting said piston means and said jaws for adjusting the latter in conformity with the movement of said piston means, a plurality of circularly spaced members extending in axial direction of said chuck and being axially guided therein, said members being firmly connected to said piston means and being provided with helical teeth, and a gear ring in mesh with the helical teeth of said members and rotatably journalled in said chuck.

2. In a chuck having a plurality of jaws equipped with teeth for radial movement of said jaws, the combination of: fluid operable axially movable piston means, a plurality of circularly spaced members extending in axial direction of said chuck and being axially guided therein, said members being firmly connected to said piston means for movement therewith and being provided with first teeth engaging the teeth of said jaws for effecting radial adjustment of the latter in conformity with the movement of said piston means, said members also being provided with second teeth, and a gear ring in mesh with the second teeth of said members and rotatably journalled in said chuck so as to rotate in said chuck in conformity with the axial movement of said piston means.

References Cited in the file of this patent

UNITED STATES PATENTS

| | | |
|---|---|---|
| 1,454,121 | Lavoie | May 8, 1923 |
| 2,597,280 | Barnes | May 20, 1952 |